United States Patent [19]

Calistrat

[11] 4,004,433
[45] Jan. 25, 1977

[54] CONTINUOUSLY LUBRICATED COUPLING

[75] Inventor: Michael M. Calistrat, Sykesville, Md.

[73] Assignee: Koppers Company, Inc., Pittsburgh, Pa.

[22] Filed: Apr. 24, 1975

[21] Appl. No.: 571,394

[52] U.S. Cl. .................................. 64/9 R; 277/133
[51] Int. Cl.² ...................... F16D 3/18; B61F 15/22
[58] Field of Search ................. 64/9 R, 14; 277/133

[56] References Cited

UNITED STATES PATENTS

| | | | |
|---|---|---|---|
| 1,899,164 | 2/1933 | Raule | 277/133 |
| 2,616,730 | 11/1952 | Neuner | 277/133 |
| 2,764,945 | 10/1956 | Heep | 277/133 |
| 3,638,453 | 2/1972 | Ehret | 64/9 |
| 3,651,662 | 3/1972 | Hoffman | 64/9 |

Primary Examiner—Samuel Scott
Assistant Examiner—Randall Heald
Attorney, Agent, or Firm—Oscar B. Brumback

[57] ABSTRACT

A continuously lubricated gear type coupling for connecting a pair of substantially co-axially aligned rotatable shafts comprising: a hub having outwardly extending gear teeth and secured to an end of one of the shafts by a key for rotation therewith; a sleeve surrounding the hub and having inwardly extending gear teeth in meshing engagement with the outwardly extending gear teeth and connected to the other shaft for rotation therewith; a plurality of inlet ports for continuously supplying a lubricant to the inwardly and outwardly meshing gear teeth; a plurality of outlet ports for removal of the lubricant from the coupling after the lubricant has lubricated the inwardly and outwardly extending gear teeth; and an annular impeller surrounding the one shaft and secured to the hub to direct the flow of air or corrosive gases away from the key and keyways of the coupling upon rotation thereof thereby preventing the air or corrosive gases from entering the coupling through the keyway and causing corrosion thereof. The coupling preferably includes a sealing mechanism connected to the end of the one shaft and in sealing engagement with the hub to further insure that air or corrosive gases do not enter the interior of the coupling through the space occupied by the key.

2 Claims, 4 Drawing Figures

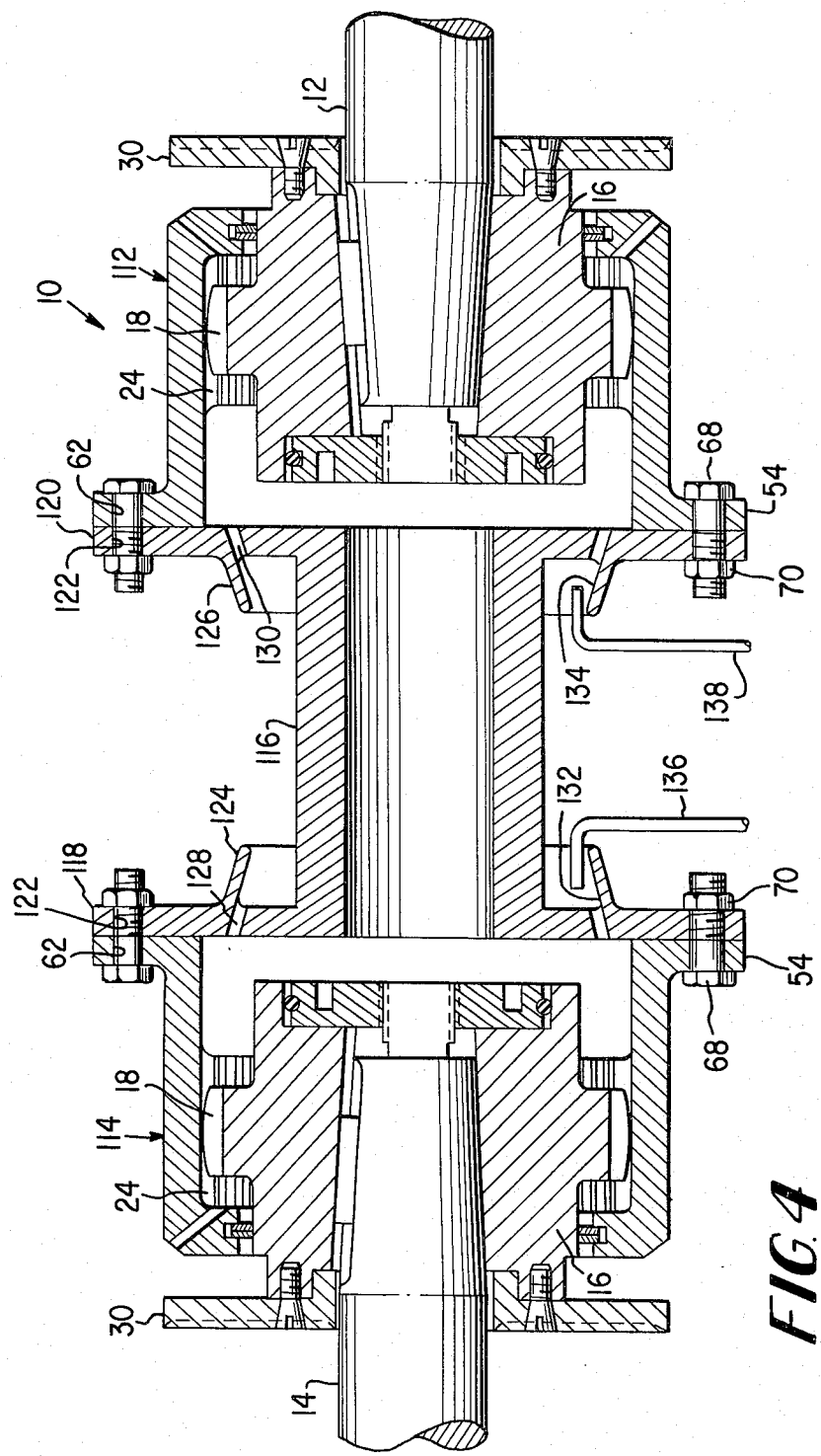

CONTINUOUSLY LUBRICATED COUPLING

BACKGROUND OF THE INVENTION

1. Field of the Invention

This invention relates generally to flexible shaft couplings having intermeshing gear teeth and more particularly to continuously lubricated gear type couplings connected to shafts by keys and means to prevent air or corrosive gases from entering the interior of the coupling through the space occupied by the key.

2. Description of the Prior Art

Conventional prior art continuously lubricated gear type couplings include a pair of coupling halves each having a hub which has outwardly extending gear teeth and a sleeve surrounding each hub and having inwardly extending gear teeth in meshing engagement with the gear teeth of the hubs. Each hub is secured to the end of a shaft by a key inserted in keyways formed in the hubs and in the shafts. The shafts are substantially co-axially aligned and each coupling half is rotatably connected to each shaft. A spacer is connected between each of the coupling halves thus allowing the transmission of torque from one shaft to the other shaft. Each end of the spacer which is connected to each of the coupling halves contains a circumferentially extending trough. The spacer further includes a plurality of openings that extend from the trough through the spacer and into the upper portion of each coupling half. At the opposite end of each of the coupling halves, each sleeve contains a plurality of openings extending from the interior of the coupling near the intermeshing gear teeth to the outside of each of the coupling halves. A lubricant is continuously supplied to the trough at each end of the spacer and, as the coupling rotates, the lubricant flows through the openings into the interior of each coupling half. As the coupling rotates, the centrifugal force keeps the lubricant in contact with the inside surface of each of the sleeves. The lubricant flows along the inside surface of the sleeve to the intermeshing gear teeth thus lubricating the gear teeth so damage to the gear teeth does not result from metal to metal contact. The lubricant flows through the spaces between the intermeshing gear teeth and out through the openings at the end of each coupling sleeve. An example of one type of continuously lubricated coupling is shown in Zrodowski U.S. Pat. No. 2,726,523.

Although the prior art couplings perform well in that they transmit a great amount of torque and maintain constant lubrication between the intermeshing gear teeth, they do have a number of disadvantages. Because the lubricant is introduced through the openings in the spacer near the inside surface of the sleeve and is directed to the intermeshing gear teeth by the centrifugal forces caused by the rotation of the coupling, the lubricant is prevented from reaching the interior portions of the coupling. In addition, because the lubricant flows through the openings in the spacer and out through the openings in the sleeves, it causes a slight vacuum in the interior portions of the coupling. This slight vacuum in the interior of the coupling causes air to flow from outside the coupling through the keyways formed in the hubs and shafts and into the interior of the coupling. It has been found that when a coupling is used in an environment that contains a corrosive gas such as hydrogen, the hydrogen flows through the keyways and into the interior of the coupling. The hydrogen or other corrosive gases attack the metal of each coupling half that is not protected by the lubricant. In particular, this corrosive gas corrodes the interior of the spacer between the coupling halves below the lubricant openings in the spacer and causes cracks to form in the spacer which causes the spacer to break prematurely.

The obvious way to prevent the introduction of corrosive gases into the interior of the coupling through the keyways is to eliminate the key as a means of rotationally securing each coupling half to each shaft. This can be accomplished by utilizing conventional keyless hydraulic fit connections. However, the use of such hydraulic connections is extremely expensive and such solutions to the above problem are not acceptable in many instances. Thus, other solutions must be found to prevent corrosive gases from entering the coupling when the coupling utilizes keys to secure each coupling hub to the shaft.

SUMMARY OF THE INVENTION

Accordingly, an object of the present invention is to provide a continuously lubricated gear coupling that will overcome the aforementioned disadvantages and others; thus, this invention provides a continuously lubricated gear type coupling which is connected to a pair of shafts by keys with a device that prevents corrosive gases from entering the interior of the coupling through the keyways between the hubs and the shafts and attacking the non-lubricated portions of the coupling.

This is generally accomplished by providing a continuously lubricated gear type coupling that connects a pair of substantially coaxially aligned rotatable shafts with: a hub means having outwardly extending gear teeth and secured to an end of one of the shafts by a key means for rotation therewith; a sleeve means surrounding the hub means and having inwardly extending gear teeth in meshing engagement with the outwardly extending gear teeth and connected to the other of the shafts for rotation therewith; a plurality of inlet port means for continuously applying lubricant to the inwardly and outwardly meshing gear teeth; a plurality of outlet port means for removal of the lubricant from the coupling after the lubricant has lubricated the inwardly and outwardly extending gear teeth; and an annular impeller means surrounding the one shaft and secured to the hub means to direct the flow of air or corrosive gases away from the key means upon rotation of the coupling thereby preventing the air or gases from entering the coupling through the key means and causing corrosion thereof.

The above and further objects and novel features of the invention will appear more fully from the following detailed description when the same is read in connection with the accompanying drawings. It is to be expressly understood, however, that the drawings are not intended as a definition of the invention but are for the purpose of illustration only.

BRIEF DESCRIPTION OF THE DRAWINGS

In the drawings, wherein like parts are marked alike:

FIG. 4 is a side view in cross section of a pair of coupling halves of the present invention secured to coaxially aligned rotatable shafts and having a spacer means connecting the pair of coupling halves.

DESCRIPTION OF THE PREFERRED EMBODIMENT

Figure 1:
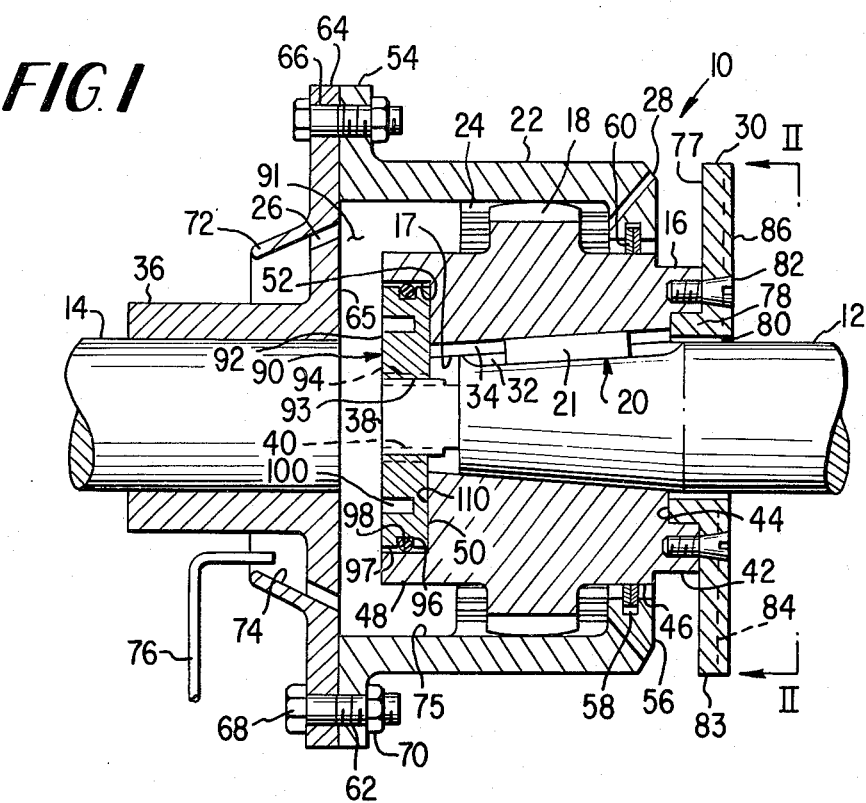
FIG. 1 is a side view in cross section of a coupling of the present invention showing a continuously lubricated coupling half connected between a pair of coaxially aligned rotatable shafts and an impeller means secured to the hub of the coupling.

Referring to FIG. 1, the invention generally comprises a continuously lubricated gear type coupling, denoted generally by numeral 10, for connecting a pair of substantially coaxially aligned rotatable shafts 12 and 14. Coupling 10 generally comprises in combination a hub means 16, having outwardly extending gear teeth 18, secured to shaft 12 by a key means 20 for rotation therewith. A sleeve means 22 surrounds hub means 16 and has inwardly extending gear teeth 24 in meshing engagement with outwardly extending gear teeth 18 and is connected to other shaft 14 through a hub 36. A plurality of circumferentially spaced inlet port means 26 in hub 36 provides for a continuous supply of lubricant to the meshing gear teeth 24 and 18 respectively. A plurality of circumferentially spaced outlet port means 28 in sleeve means 22 is used for removal of the lubricant from coupling 10 after the lubricant has lubricated the gear teeth 24 and 18 respectively. An annular impeller means 30 surrounds shaft 12 and is secured to hub means 16 for directing air or corrosive gases away from the area around key means 20 upon rotation of coupling 10 thereby preventing the air or corrosive gases from entering coupling 10 through key means 20 and causing corrosion inside coupling 10.

More specifically, and referring to FIG. 1, coupling 10, as it is shown, is actually a half coupling which is secured between two substantially co-axially aligned rotatable shafts 12 and 14 for transmitting torque between shafts 12 and 14. Coupling 10 comprises a hub 16 which is secured to shaft 12 by a key means 20. Preferably the bore 17 of hub 16 is tapered along with the end of shaft 12 so that when hub 16 is placed on shaft 12, the tapered end of shaft 12 fits into the tapered bore 17 of hub 16.

Preferably, the manner of rotationally securing hub 16 to shaft 12 is by key means 20. The method of holding hub 16 on the tapered end of shaft 12 will be described later. Key means 20 includes a keyway 32 extending to the end of shaft 12 along the tapered portion thereof. In addition, hub 16 has a keyway 34 along the length of tapered bore 17. Hub 16 is placed on shaft 12 so that keyways 32 and 34 are in radially alignment. A key 21 is inserted within keyways 32 and 34 to rotatably secure hub 16 to the end of shaft 12.

Hub 16 further includes outwardly extending gear teeth 18 around the outer periphery thereof. Preferably, gear teeth 18 are crowned in the axial direction in the conventional manner as shown in FIG. 1 so that piloting may be maintained between hub 16 and sleeve 22. Hub 16 further includes an axially extending flange 42 creating a recess 44 in hub 16. In addition, hub 16 includes a second axially extending flange 48 on the other end of hub 16 creating a recess 50 in the body of hub 16.

Again referring to FIG. 1, sleeve 22 surrounds hub 16 and contains inwardly extending gear teeth 24 which are in meshing engagement with outwardly extending gear teeth 18 of hub 16. Sleeve 22 includes a radially extending flange 56 which extends inwardly to a point just above a shoulder portion 46 on hub 16. Inwardly extending flange 56 further includes a circumferentially extending groove 58. A conventional sealing ring 60 fits within groove 58 and is in sealing engagement with shoulder portion 46 on hub 16. It should be noted that the outside diameter of sealing ring 60 should be less than the diameter of the bottom of groove 58 forming a space between the bottom of groove 58 and the outer periphery of seal 60. This allows hub 16 and sleeve 22 to angularly flex a slight amount about each other to compensate for any angular misalignment between shafts 12 and 14. Sealing ring 60 is to prevent foreign material from entering coupling 10 between sleeve 22 and hub 16 which may become lodged between intermeshing gear teeth 18 and 24 and cause damage thereto.

Sleeve 22 further includes a radially outwardly extending flange 54 which contains a plurality of circumferentially spaced axially extending openings through flange 54. Sleeve 22 further includes a plurality of outlet ports 28 circumferentially spaced around flange 56 and which extend through flange 56 to the interior of coupling 10 at a point close to the intermeshing gear teeth 18 and 24. Preferably, outlet ports 28 extend at an angle from flange 56 so that when coupling 10 is rotating, the centrifugal forces created by rotation will cause lubricant around intermeshing gear teeth 18 and 24 to flow upward through outlet ports 28 and be expelled from coupling 10.

A conventional hub 36 is secured in any conventional manner to shaft 14 so that hub 36 is rotatably secured to shaft 14. If desired, hub 36 can be an integrally formed part of shaft 14. Hub 36 includes a radially extending flange 64 of substantially the same diameter as flange 54 of sleeve 22. Flange 64 of hub 36 contains axially extending openings 66 therethrough in alignment with openings 62 in flange 54. Sleeve 22 is secured to hub 36 through the axially aligned openings 62 and 66 by bolts 68 and nuts 70. Hub 36 further includes an annular lip 72 extending axially from flange 64 and is formed at an angle so that lip 72 slopes inwardly toward shaft 14 forming a trough 74 between the inner surface of lip 72 and flange 64. A plurality of inlet ports 26 circumferentially spaced around flange 64 extend from trough 74 in lip 72 through flange 64 and into a space 91 between hub 16, sleeve 22, and hub 36. It should be noted that lip 72 and inlet ports 26 are formed on flange 64 at a point below surface 75 of sleeve 22. A conventional lubricant tube 76 is secured to a conventional lubricant supply means (not shown) and extends into trough 74 formed by lip 72. A lubricant is supplied from tube 76, it flows into trough 74 and when coupling 10 is rotating, the centrifugal forces force the lubricant through inlet ports 26. When coupling 10 is rotating, the lubricant is also forced to surface 75 of sleeve 22 by the centrifugal forces and flows between intermeshing gear teeth 18 and 24 thereby lubricating intermeshing gear teeth 18 and 24 so they are not damaged.

Figures 2, 3:
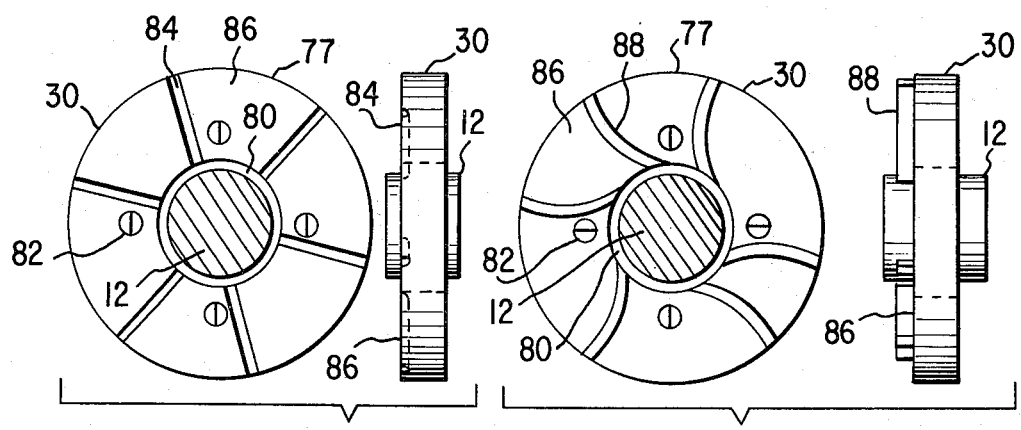
FIG. 2 is an end view of the impeller means of FIG. 1 taken along the lines II—II showing the radially extending grooves on the surface of the impeller means.
FIG. 3 is a view similar to FIG. 2 of an alternate embodiment of the impeller means of FIG. 1 showing radially extending curved vanes secured to the impeller means.

Referring now to FIGS. 1–3, to prevent air or corrosive gases on the outside of coupling 10 from passing through keyway 32 in shaft 12 and keyway 34 in hub 16 and into space 91 in the interior of coupling 10, an impeller means 30 is secured to the end of hub 16. Since the centrifugal forces of rotating coupling 10 will throw the lubricant outwardly to surface 75 after passing through inlet ports 26, the inside surface 65 of flange 64 below inlet ports 26 may not be protected by the lubricant. Therefore, air or corrosive gases entering through keyways 32 and 34 can attack surface 65 in space 91 causing surface 65 to corrode and eventually crack which will cause premature failure of hub 36. In addition, the lubricant may not contact hub 16 except where gear teeth 18 and 24 are in meshing engagement. Therefore, the air or corrosive gases can attack the surfaces of hub 16 which are not protected by the lubricant thereby causing hub 16 to corrode and crack which results in premature failure.

An impeller means 30 is secured to hub 16 to direct the air or corrosive gases that are around the exterior of coupling 10 near shaft 12 away from coupling 10 thus preventing the gases from entering keyways 32 and 34. Impeller means 30 includes an annular plate 77 having a diameter substantially the same as the diameter of sleeve 22. Annular plate 77 includes an axially extending central opening 80 having a diameter substantially the same as the diameter of shaft 12. Annular plate 77 further includes an axially extending flange 78 having sufficient length to fit within recess 44 of hub means 16. In addition, annular plate 77 includes a plurality of radially extending grooves 84, as shown in FIG. 2, extending from opening 80 outward to the outer periphery 83 of annular plate 77. Radially extending grooves 84 are formed on outer surface 86 of annular plate 77. Plate 77 is secured to flange 42 of hub 16 such as by screws 82. Thus, when coupling 10 rotates, annular impeller means 30 will also rotate. As impeller means 30 rotates, the air or corrosive gases around coupling 10, and particularly the air or corrosive gases around shaft 12, will be caught by grooves 84 and caused to flow outward through grooves 84 rather than through keyways 32 and 34 in shaft 12 and hub 16 respectively. Thus, corrosive gases are prevented from entering space 91 in the interior of coupling 10.

Referring to FIG. 3, which shows an alternate embodiment of impeller means 30, the efficiency of impeller means 30 may be increased by securing, such as by welding, a plurality of curved vane members 88 on surface 86 of annular plate 77. Curved vane members 88 extend radially from opening 80 to the outer periphery 83 of annular plate 77. As shown in FIG. 3, vane members 88 extend axially away from surface 86 and are curved. Thus, when impeller means 30 rotates in a clockwise direction, vane members 88 pick up the air or corrosive gases around shaft 12 and throw the air or corrosive gases away from coupling 10 thus preventing the air or corrosive gases from entering space 91 through keyways 32 and 34. Although it is preferred that vane members 88 be curved, vane members 88 may also be straight vanes (not shown) radially extending from opening 80 to the outer periphery 83 and still be within the scope of the invention.

Referring to FIG. 1, coupling 10 also preferably includes a sealing means, denoted generally by numeral 90, secured to an end 38 of shaft 12 and in sealing engagement with hub means 16. Sealing means 90 holds hub 16 onto the tapered portion of shaft 12 in addition to being in sealing engagement with hub means 16. Sealing means 90 is to further insure that no corrosive gases will penetrate into space 91 through keyways 32 and 34. Sealing means 90 preferably includes an annular disc 92 having an outer diameter substantially equal to the diameter of shoulder portion 52 of flange 48 on hub means 16. Annular disc 92 further includes a central axial opening 93 havng an internal threaded portion 94. Shaft 12 includes an axially extending end portion 38 having a diameter substantially the same as central opening 93 in annular disc 92. End portion 38 further includes a threaded portion 40. Annular disc 92 includes a plurality of openings 100 so that annular disc 92 may be threaded on end portion 38. Annular disc 92 further includes a slot 96 formed in the outer periphery 97 thereof. An annular seal 98, preferably, a conventional O-ring type seal ring, fits within slot 96 so that seal 98 is in contact with the side and bottom of slot 96 and in contact with shoulder portion 52 of flange 48. Annular disc 92 is threaded by a conventional tool inserted into openings 100 on end portion 38 so that it contacts surface 110 of recess 50 on hub means 16. Annular disc 92 is threaded on end portion 38 until tapered bore 17 of hub means 16 is in tight engagement with the tapered portion of shaft 12. Thus, annular disc 92 holds hub means 16 on shaft 12. In addition, seal 98 is in contact with the sides and bottom of slot 96 and with shoulder portion 52 on flange 48 thus making an air tight seal between keyways 32 and 34 and space 91 in the interior of coupling 10.

Referring now to FIG. 4, where a relatively high degree of misalignment is encountered between coaxially aligned shafts 12 and 14, one coupling half such as shown in FIG. 1 may not give the desired degree of misalignment. When a high degree of misalignment is needed, a pair of coupling halves interconnected by a spacer is secured to both shafts 12 and 14. When such a coupling is used, it preferably comprises a first half coupling, denoted generally by numeral 112, secured to shaft 12 and a second half coupling denoted generally by numeral 114, secured to the other shaft 14. Preferably, in counter distinction to the coupling in FIG. 1, both shafts 12 and 14 have tapered end portions. Both coupling halves 112 and 114 are secured to shaft 12 and 14 respectively in the manner previously described for the single half coupling as shown in FIG. 1. Both half couplings 112 and 114 are identical to the half coupling as shown in FIG. 1 and therefore half couplings 112 and 114 will not be further described. A spacer means 116 connects first half coupling 112 with second half coupling 114. The axial length of spacer means 116 is substantially the same as the axial distance between flanges 54 on each coupling half 112 and 114. Spacer means 116 includes a radially extending flange 120 on one end thereof and a second radially extending flange 118 on the other end thereof. Flanges 118 and 120 include axially extending openings 112 therethrough in axial alignment with openings 62 in flanges 54 of each coupling half 112 and 114. Spacer means 116 is secured to each flange 54 of coupling halves 112 and 114 by bolts 68 and nuts 70.

Again, referring to FIG. 4, flange 120 of spacer means 116 includes a circumferentially extending lip 126 sloped toward the center of spacer means 116 forming a trough 134 between lip 126 and flange 120. A plurality of inlet ports 130 is formed from trough 134 through flange 120 into the interior of coupling half 112. Flange 118 of spacer means 116 also includes a circumferentially extending lip portion 124 which slopes toward the center of spacer 116 forming a trough 132 between lip 124 and flange 118. A plurality of inlet ports 128 extend from trough 132 through flange 118 into the interior of coupling half 114. Lubricant supply pipes 136 and 138 extend into troughs 132 and 134 respectively for supplying the lubricant to troughs 132 and 134. When coupling 10 rotates, the lubricant flows through inlet ports 130 and 138 and into the interior of coupling halves 112 and 114 so that the lubricant flows between intermeshing gear teeth 18 and 24 of each coupling half 112 and 114. Again, air or corrosive gases are prevented from entering coupling halves 112 and 114 by the use of an impeller means 30 connected to each hub 16 in the same manner as previously described for coupling 10 in FIG. 1.

In operation, and referring to FIGS. 1, 2 and 3, coupling hubs 16 and 36 are secured to the ends of shafts 12 and 14 respectively as previously described. For illustration purposes only, shaft 14 will be regarded as the driving shaft and shaft 12 will be the driven shaft. Shaft 14 is connected to a conventional motor or other apparatus (not shown) for rotating shaft 14. When shaft 14 is rotated, torque is transmitted through hub 36 to coupling 10 and, since shaft 12 is rotatably connected to coupling 10 by key means 20, shaft 12 rotates, turning the apparatus to be driven (not shown). When shaft 10 rotates, lubricant is supplied through lubricating pipe 76 by any conventional lubricant supply means (not shown). The lubricant passes through pipe 76 into trough 74 between lip 72 and flange 64 of hub 36. The centrifugal forces created by the revolving coupling 10 forces the lubricant through the plurality of inlet ports 26 in flange 64. The lubricant then enters the interior of coupling 10 and the centrifugal forces force the lubricant to surface 75 of sleeve means 22. The lubricant flows axially along surface 75 until it contacts intermeshing gear teeth 18 and 24 thereby lubricating intermeshing gear teeth 18 and 24 and preventing any damage that might occur from metal to metal contact. The lubricant continues to pass through intermeshing gear teeth 18 and 24 until it reaches flange 56 on sleeve 22. The centrifugal forces force the lubricant through outlet ports 28 in flange 56 thereby removing the lubricant from the interior of coupling 10.

Referring to FIGS. 1, 2 and 3, as coupling 10 rotates, impeller means 30 also rotates since it is rigidly connected to hub means 16. As impeller means 30 rotates, the radially extending grooves 84 shown in FIG. 2, or the radially extending curved vanes 88 shown in FIG. 3, catch the air or corrosive gases surrounding shaft 12 causing the air or corrosive gases to flow outward through grooves 84 or radially along vanes 88 to the outer portion of coupling 10. In this manner the air or corrosive gases are not allowed to enter keyway 32 and 34 through central opening 80. Thus, air or corrosive gases are prevented from entering space 91 in the interior of coupling 10. In addition, should a slight amount of air or corrosive gases not be picked up by grooves 84 or vanes 88 and thrown away from coupling 10 and allowed to enter keyways 32 and 34, the air or corrosive gases are prevented from entering into space 91 by sealing means 90. Since sealing means 90 contains sealing O-ring 98, which is in sealing engagement between annular disc 92 and shoulder portion 52 of flange 48 on hub means 16, no air or corrosive gases can enter space 91. Thus, as coupling 10 is rotated no air or corrosive gases can penetrate the interior of coupling 10 and corrode the inner surfaces of the coupling not protected by the lubricant.

The operation of the coupling as shown in FIG. 4 is identical to that described in FIG. 1 except the operation involves both coupling halves 112 and 114 rather than a single coupling half as shown in FIG. 1 and thus will not be further described.

The foregoing has presented a novel, continuously lubricated gear type coupling for preventing corrosive gases from entering the interior of the coupling and attacking those portions of the couplings not lubricated. The problem of having air or corrosive gases entering the coupling half by way of the keyways has been eliminated by providing an impeller means containing a plurality of grooves or curved vane numbers which deflect the gas away from the area of the keyway so that it is not allowed to enter therein. In addition, a sealing means has been provided in the interior of the coupling between the rotating shaft and the hub of the coupling to insure that any air or corrosive gases that may escape deflection by the impeller is kept from the interior of the coupling.

Accordingly, the invention having been described in its best embodiment and mode of operation, that which is desired to be claimed by Letters Patent is:

1. A continuously lubricated gear-type coupling for connecting a pair of substantially coaxially aligned rotatable shafts, comprising:

a hub means, having outwardly extending gear teeth, secured to an end of one of said shafts by a key means for rotation therewith;

a sleeve means surrounding said hub means, having inwardly extending gear teeth in meshing engagement with said outwardly extending gear teeth, said sleeve means including an annular metallic sealing ring means between an inturned flange portion of said sleeve means and a shoulder portion of said hub means for preventing the flow of lubricant between said flange portion and said shoulder portion;

a second hub means connecting said sleeve means to the other of said shafts forming a closed chamber within said coupling, said second hub means including an annular lip portion tapering inwardly in a direction away from said sleeve means thus forming an annular trough means on an exterior radial face of said second hub means;

a plurality of inlet port means in said exterior radial face for continuously supplying lubricant from said annular trough means to within said closed chamber;

a plurality of outlet port means in the end of said sleeve means opposite to said second hub means for removal of said lubricant from said closed chamber after said lubricant has lubricated said inwardly and outwardly extending gear teeth;

a sealing means connected to the end of said one shaft within said closed chamber for preventing gases exterior to said coupling from entering said closed chamber from between said hub means and said one shaft, said sealing means being seated within an annular recess formed in an end of said hub means and having an annular resilient sealing ring forming a gas-tight seal between said sealing means and said recess; and an annular impeller means surrounding said one shaft and secured to an end of said hub means adjacent said sleeve means, said impeller means including radially extending means formed on a radial face thereof for propelling gases radially outward from said one shaft, thereby preventing said gases from entering said coupling through said key means and causing corrosion thereof.

2. A continuously lubricated gear type coupling for transmitting torque between substantially coaxially aligned, axially spaced, first and second rotatable shafts, comprising:

first and second coupling halves each including:
- a hub means, having outwardly extending gear teeth, rotatably secured to said first and second shafts respectively by a key means, and
- a sleeve means surrounding said hub means and having inwardly extending gear teeth in meshing engagement with said outwardly extending gear teeth, said sleeve means including an annular metallic sealing ring means between an inturned flange portion of said sleeve means and a shoulder portion of said hub means for preventing the flow of lubricant between said flange portion and said shoulder portion;

a cylindrical spacer means connected between said first and second coupling halves for transmitting torque therebetween, said spacer means forming a closed chamber within each of said coupling halves and further including an annular lip portion on each end thereof tapering inwardly in a direction away from an adjacent said sleeve means thus forming an annular trough means on exterior radial faces of said spacer means;

a plurality of inlet port means in said exterior radial faces for continuously supplying a lubricant from said annular trough means to within said closed chambers;

a plurality of outlet port means in the ends of said sleeve means opposite to said spacer means for directing said lubricant from said closed chambers of said first and second coupling halves after said lubricant has lubricated said meshing gear teeth in said first and second coupling halves;

a sealing means connected to the end of each of said shafts within said closed chambers for preventing gases exterior to said coupling from entering said closed chambers from between said hub means and said shafts, said sealing means being seated within an annular recess formed in the ends of said hub means within said closed chambers, each said sealing means having an annular resilient sealing ring forming a gas tight seal between said sealing means and its associated said recess; and an annular impeller means surrounding said first and second shafts and connected to the ends of said hub means adjacent said sleeve means respectively, said impeller means including radially extending means formed on a radial face thereof for propelling gases radially outward from said shafts.

* * * * *